United States Patent
Kramer et al.

(10) Patent No.: US 12,202,675 B2
(45) Date of Patent: Jan. 21, 2025

(54) CONVEYING SYSTEM COMPRISING A PLURALITY OF CONVEYING UNITS FOR CONVEYING PRODUCTS

(71) Applicant: Vanderlande Industries B.V., Veghel (NL)

(72) Inventors: Monique Kramer, Veghel (NL); Sander Bernard Wilhelmus Van Roosmalen, Veghel (NL)

(73) Assignee: Vanderlande Industries B.V., Veghel (NL)

( * ) Notice: Subject to any disclaimer, the term of this patent is extended or adjusted under 35 U.S.C. 154(b) by 29 days.

(21) Appl. No.: 18/277,626

(22) PCT Filed: Feb. 23, 2022

(86) PCT No.: PCT/NL2022/050101
§ 371 (c)(1),
(2) Date: Aug. 17, 2023

(87) PCT Pub. No.: WO2022/182232
PCT Pub. Date: Sep. 1, 2022

(65) Prior Publication Data
US 2024/0132290 A1 Apr. 25, 2024
US 2024/0228174 A9 Jul. 11, 2024

(30) Foreign Application Priority Data
Feb. 26, 2021 (NL) .................................... 2027658

(51) Int. Cl.
*B65G 17/14* (2006.01)
*B65G 15/60* (2006.01)
(Continued)

(52) U.S. Cl.
CPC ............. *B65G 17/14* (2013.01); *B65G 15/60* (2013.01); *B65G 15/62* (2013.01); *B65G 17/067* (2013.01);
(Continued)

(58) Field of Classification Search
CPC ...... B65G 17/14; B65G 15/60; B65G 17/005; B65G 17/067; B65G 17/34; B65G 17/345;
(Continued)

(56) References Cited

U.S. PATENT DOCUMENTS 1,347,121 A * 7/1920 Rice ........................ B65G 23/44
198/813
5,458,051 A * 10/1995 Alden .................... B65G 23/44
198/813
(Continued)

FOREIGN PATENT DOCUMENTS

KR   102185471 B1   12/2020
WO   2018201845 A1   11/2018

OTHER PUBLICATIONS

International Search Report and Written Opinion of the International Searching Authority issued in corresponding application PCT/NL2022/050101 mailed Jun. 17, 2022 (10 pages).

*Primary Examiner* — Mark A Deuble
(74) *Attorney, Agent, or Firm* — Carter, DeLuca & Farrell LLP

(57) ABSTRACT

The invention relates to a conveying system comprising a plurality of conveying units comprising a chassis, a first and second roll-shaped rotating element (16, 18), a conveyor belt passed around the rotating elements (16, 18), which forms a supporting surface for a product, a first filler piece (20), wherein the first filler piece (20) is connected to the first rotating element (16) in such a way that the first filler piece (20) and the first rotating element (16) are jointly displace-
(Continued)

able towards and away from the second rotating element (18), a second filler piece (22) which is fastened to the chassis between the first filler piece (20) and the second rotating element (18), and a removable spacer element (32) which, in use, is provided in a fitting manner between the first and second filler piece (20, 22), wherein a predetermined operating distance between the first and second rotating element (16, 18) is determined as a result of the placing of the spacer element (32) between the first and second filler piece (20, 22).

12 Claims, 3 Drawing Sheets

(51) Int. Cl.
  *B65G 15/62* (2006.01)
  *B65G 17/00* (2006.01)
  *B65G 17/06* (2006.01)
  *B65G 17/34* (2006.01)
  *B65G 21/06* (2006.01)
  *B65G 47/94* (2006.01)

(52) U.S. Cl.
  CPC ........... *B65G 17/345* (2013.01); *B65G 21/06* (2013.01); *B65G 47/945* (2013.01); *B65G 17/005* (2013.01); *B65G 17/34* (2013.01)

(58) Field of Classification Search
  CPC ........ B65G 21/02; B65G 21/06; B65G 23/44; B65G 15/62; B65G 47/96; B65G 47/945; B65G 15/00
  USPC ................................... 198/370.06, 813–816
  See application file for complete search history.

(56) References Cited

U.S. PATENT DOCUMENTS

| | | | | |
|---|---|---|---|---|
| 5,547,084 | A * | 8/1996 | Okada | B65G 54/02 |
| | | | | 209/939 |
| 6,446,782 | B1 * | 9/2002 | Patrick | B65G 47/71 |
| | | | | 198/370.06 |
| 6,938,750 | B2 * | 9/2005 | Miller | B65G 23/23 |
| | | | | 198/370.06 |
| 7,025,196 | B2 * | 4/2006 | Pfarr | B65G 43/08 |
| | | | | 198/813 |
| 7,080,725 | B2 * | 7/2006 | Hishinuma | B65G 17/345 |
| | | | | 198/370.1 |
| 7,104,387 | B2 * | 9/2006 | Brixius | B65G 17/345 |
| | | | | 198/370.06 |
| 7,322,462 | B2 * | 1/2008 | Landry | B65G 23/44 |
| | | | | 198/813 |
| 7,987,963 | B2 * | 8/2011 | Baum | B65G 17/345 |
| | | | | 198/890.1 |
| 8,033,379 | B2 * | 10/2011 | Syndikus | B65G 17/345 |
| | | | | 198/370.06 |
| 2024/0270501 | A1 * | 8/2024 | Stumpf | B65G 15/60 |

* cited by examiner

CONVEYING SYSTEM COMPRISING A PLURALITY OF CONVEYING UNITS FOR CONVEYING PRODUCTS

CROSS-REFERENCE TO RELATED APPLICATIONS

This application is a National Stage Application under 35 U.S.C. § 371(a) of PCT/NL2022/050101, filed on Feb. 23, 2022, which claims the benefit of and priority to Netherlands Patent Application No. 2027658 filed on Feb. 26, 2021. The entire contents of the foregoing applications are incorporated by reference herein.

BACKGROUND

The present invention relates to a conveying system comprising a plurality of conveying units for conveying products, and to a method for placing a conveyor belt on a conveying unit of such a conveying system.

U.S. Pat. No. 1,347,121 relates to a device for adjusting the tension of an endless conveyor canvas.

KR 20190081775 A relates to an apparatus for replacing a belt of a conveyor. The apparatus has a complex adjusting mechanism for changing a distance between drive rolls.

A conveying system that is also known has a plurality of conveying units for conveying products, wherein each conveying unit has a chassis, a first and a second roll-shaped rotating element which are provided parallel to and spaced apart from one another on the chassis so as to be rotatable about a respective first and second axis of rotation, and has a conveyor belt which is passed around the two rotating elements and forms a supporting surface for a product. In this case, the conveying units may be provided in succession in a train, such as an endless train, and be displaced along a fixed conveying path. Alternatively, the conveying units may be provided in such a way that they are able to be displaced, independently of one another, between a supply location and a discharge location.

An object of the present invention is to provide a conveying system whose conveying units can be provided with conveyor belts in a simple and efficient manner.

Another object of the invention is to provide a conveying system having conveying units with a simple construction with respect to the attachment or replacement of conveyor belts thereof.

Yet another object of the invention is to provide an improved conveying system.

SUMMARY

One or more of said objects is/are achieved with the conveying system according to the present invention, comprising a plurality of conveying units for conveying products from a supply location to a discharge location. Each of the plurality of conveying units comprises a chassis, a first and a second roll-shaped rotating element which are provided parallel to and spaced apart from one another on the chassis so as to be rotatable about a respective first and second axis of rotation, and a conveyor belt which is passed around the two rotating elements and forms a supporting surface for a product. In this case, the conveying unit may comprise a drive device for driving one or both of the rotating elements in rotation in order to drive the conveyor belt in a conveying direction of the conveyor belt. Each conveying unit further comprises a first filler piece which is provided between the first and second rotating element, and a second filler piece which is fastened to the chassis between the first filler piece and the second rotating element. The first filler piece is connected to the first rotating element in such a way that the first filler piece and the first rotating element are provided on the chassis so as to be jointly displaceable towards the second rotating element and away from the second rotating element in a direction transverse to the first axis of rotation. Each conveying unit further comprises a removable spacer element which, in use, is provided in a fitting manner between the first and second filler piece, wherein a predetermined operating distance between the first and second rotating element, that is to say between the respective axes of rotation thereof, is determined as a result of the placing of the spacer element between the first filler piece and the second filler piece.

One effect of the conveying system according to the invention is that by providing the two filler pieces and the removable spacer element, it is possible to pass a conveyor belt around the rotating elements of a conveying unit in a very simple and efficient manner since, in a state when the spacer element has not been placed, the first rotating element can be displaced towards the second rotating element so that space is created for easily placing the conveyor belt around the rotating elements. The spacer element can then be placed between the filler pieces, as a result of which the operating distance between the rotating elements is determined. This operating distance is predetermined in such a way that, in a state when the spacer element has been placed, the conveyor belt is at a tension within a desired range. Due to the fact that the length of conveyor belts usually proves to be sufficiently accurate, the inventors have realized that the bringing of the conveyor belt to a predetermined specific tension and the subsequent securing of the rotating elements to the chassis, the final distance between the rotating elements resulting from this tensioning operation, is not necessary. According to the invention, the mutual distance may be brought to the predetermined operating distance by placing the spacer element. In this case, specific active setting of the tension in the belt is thus not necessary; this results from bringing the rotating elements to the operating distance by means of the spacer element, and the tension is thus assumed to be within a desired range. In this case, some variation in tension may be at issue, for example due to a length tolerance of the conveyor belt. After the conveyor belt has been placed, it is thus not necessary for the first rotating element to be arranged on the chassis so as to be secured against displacement in the conveying direction, since the operating distance is determined by the presence of the filler pieces and the spacer element between the two rotating elements, and displacement of the first rotating element away from the second rotating element is limited by the tension in the conveyor belt. In this way, an improved conveying system whose conveying units can be provided with conveyor belts in a simple and efficient manner is provided. The filler pieces and the spacer element may be components of very simple design. In this context, it is noted that the ability to efficiently place or exchange conveyor belts is important in such conveying systems which usually have a large number of conveying units (dozens or even hundreds of conveying units). This is achieved according to the invention.

In one embodiment, the spacer element is panel-shaped and/or elongate. In one embodiment, the first filler piece is elongate and/or panel-shaped. In one embodiment, the second filler piece is elongate and/or panel-shaped. In this way, said components may together effectively form a support surface for the conveyor belt, which for example increases the load-bearing capacity of the conveyor belt.

In one embodiment, the spacer element and/or the first filler piece and/or the second filler piece are/is formed by means of extrusion.

In one embodiment, the first and second filler piece each comprise a longitudinal guide and the spacer element comprises, on opposite longitudinal sides thereof, a respective guide element configured to cooperate with the longitudinal guides. One effect thereof is that the spacer element can be placed between the first and second filler piece in an efficient and operationally reliable manner by sliding the spacer element between the first and second filler piece. In this case, the guide elements are thus guided along the longitudinal guides. A simple combination of longitudinal guide and guide element may be formed by a tongue and groove-type guide.

In one embodiment, the respective longitudinal guides of the first and second filler piece extend parallel to the first and second axes of rotation. This makes it possible to attach the spacer element from a side of the conveying unit in a simple manner.

In one embodiment, the first and second filler piece and the spacer element together form a support surface for the conveyor belt.

In one embodiment, the chassis comprises two opposite elongate chassis parts, preferably formed from a panel, between which the first and second rotating element, the first and second filler piece and the spacer element extend, preferably all transversely with respect to the extension direction of the chassis parts.

In this case, in one embodiment, a cutout is provided in at least one of the chassis parts, through which cutout the spacer element may pass for attaching the spacer element between the first and second filler piece. This makes it possible to attach the spacer element in a very simple manner.

The invention also relates to a method for placing a conveyor belt on a conveying unit of an above-described conveying system according to the invention. The method comprises:
a) placing the conveyor belt around the first and second rotating element while the spacer element is separate from the conveying unit and the first and second rotating element are at a mutual distance that is smaller than the predetermined operating distance,
b) increasing the mutual distance between the first and second rotating element by displacing the first rotating element together with the first filler piece away from the second rotating element, so as to thus make space for the spacer element between the first and second filler piece,
c) placing the spacer element in a fitting manner between the first and second filler piece, as a result of which the operating distance between the first and second rotating element is determined.

In one embodiment, step a) comprises placing the conveyor belt when the conveying unit is in a state where only one of the two chassis parts is connected to the first and second rotating element, after which the second of the two chassis parts is connected to the first and second rotating element. This is particularly advantageous when placing or replacing an endless conveyor belt.

In one embodiment, the increasing of the mutual distance according to step b) is implemented by jointly displacing, optionally using a tool, the first rotating element and the first filler piece counter to a tension in the conveyor belt away from the second rotating element, as a result of which the mutual distance becomes at least equal to the predetermined operating distance.

In one embodiment, the increasing of the mutual distance according to step b) is implemented by the placing of the spacer element according to step c). For example, this may be effectively done by embodying the spacer element in the shape of a wedge and adapting the shape of the first and/or second filler piece thereto.

Advantages of the method according to the invention and the aforementioned embodiments thereof are analogous to the aforementioned advantages of the system according to the invention. Embodiments of the system according to the invention are similarly applicable to the method according to the invention, and vice versa.

BRIEF DESCRIPTION OF THE DRAWINGS

The invention is described in more detail below on the basis of the description of preferred embodiments of systems according to the invention, with reference to the following schematic figures. In the figures.

DETAILED DESCRIPTION

Figure 1A:
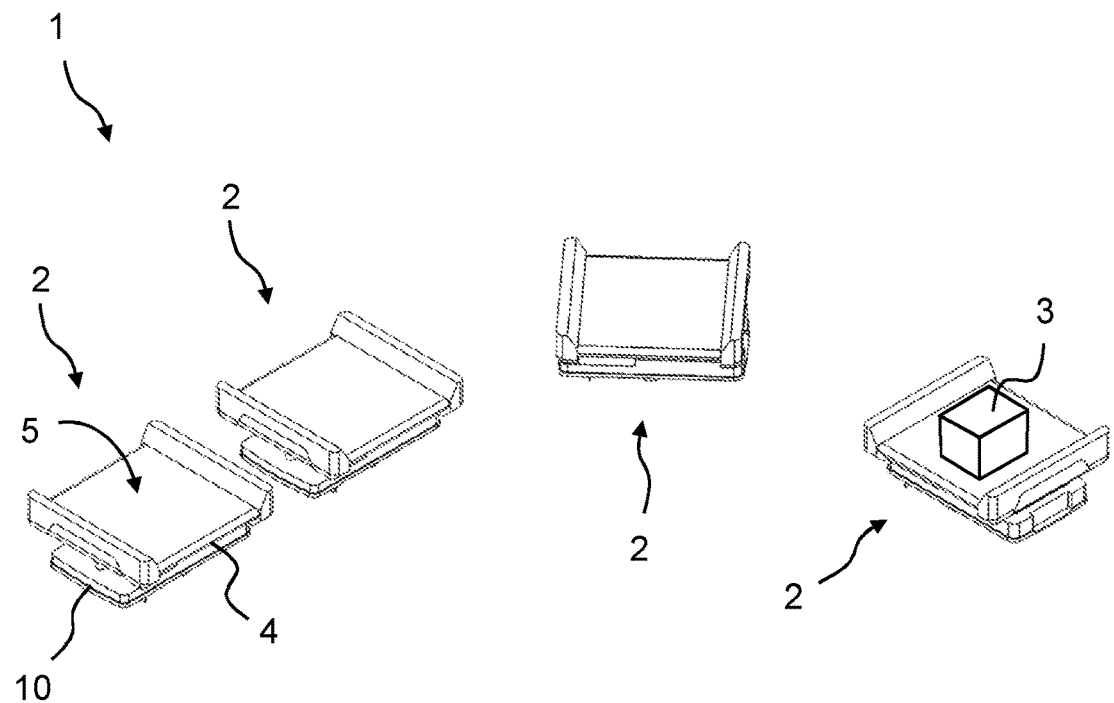
FIGS. 1*a*, 1*b* and 1*c* show a plurality of conveying units of respective preferred embodiments of a conveying system according to the invention.
Figure 1B:
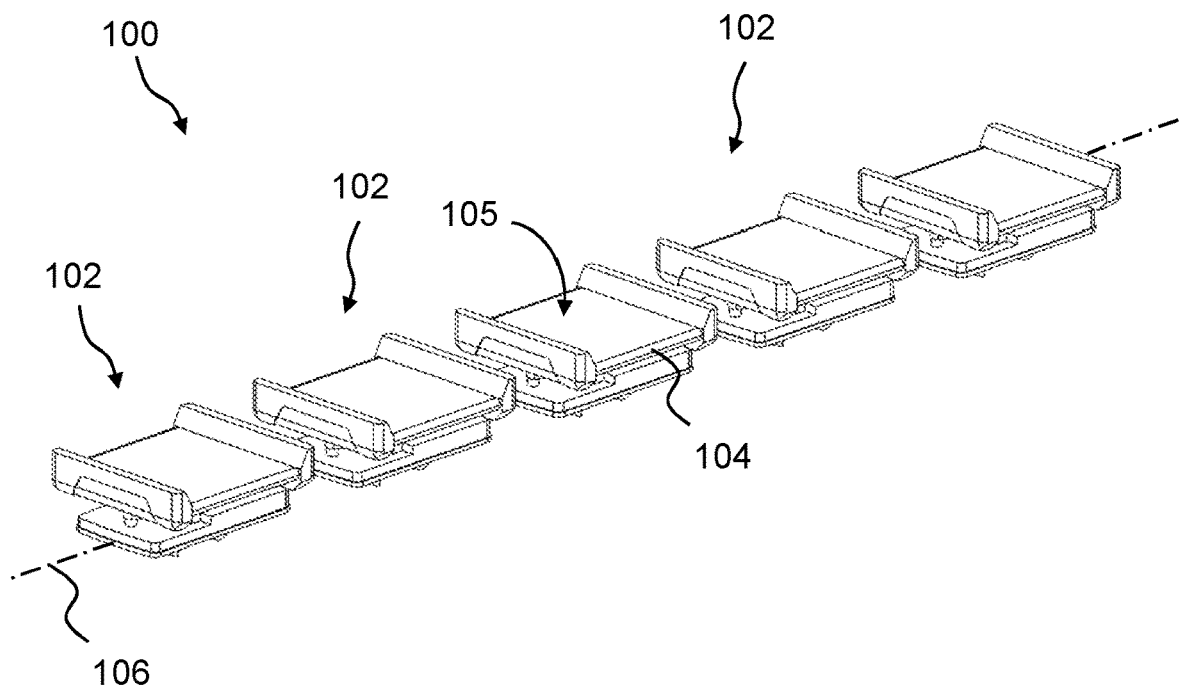
Figure 1C:
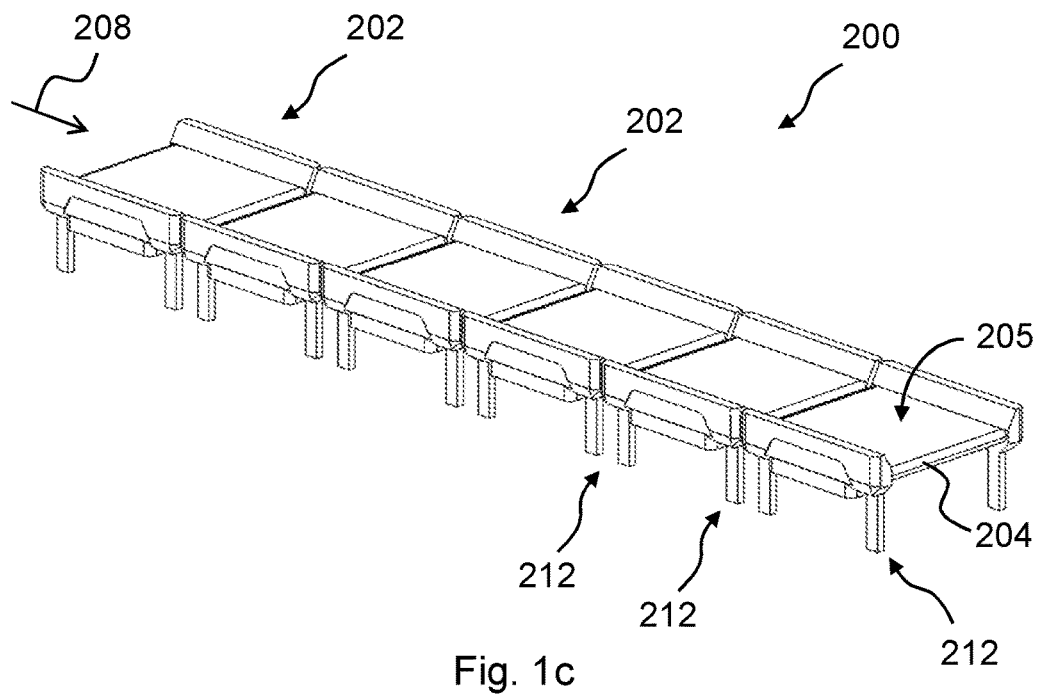

The conveying units 2; 102; 202 shown in highly schematic form in FIGS. 1*a*-1*c* form part of respective conveying systems 1; 100; 200 which have a plurality of such conveying units for conveying products 3, wherein each conveying unit has a supporting surface 5; 105; 205, formed by a conveyor belt 4; 104; 204, for a product 3. The conveyor belt may be driven by a drive device provided on the conveying unit itself, such as for moving a product away in a conveying direction of the conveyor belt of the conveying unit.

Conveying units 2 can be displaced independently of one another, such as in a space between a supply location and a discharge location, and may for example be autonomously guided vehicles having a displacement device 10, it being possible for individual conveying units to be controlled by means of a central control unit of the system 1. The conveying system 1 may comprise dozens or hundreds of such conveying units 2. Conveying units 102 of conveying system 100 are designed to be displaced in the manner of a train, possibly physically coupled to one another, along a fixed path 106, such as for example over rails or another guide. The conveying system 100 may comprise dozens or hundreds of such conveying units 102. In this case, the conveying units may also each have a displacement device 110, or may be driven by displacement devices provided along the conveying path. Conveying units 202 of conveying system 200 are arranged in a stationary manner on chassis parts 212 thereof, the conveyor belts 204 being oriented in the conveying direction 208 in such a way that products may be conveyed over the conveying units 202 in the conveying direction by driving the respective conveyor belts 204 thereof in the conveying direction. The conveying system 200 may comprise dozens or hundreds of such conveying units 202.

In the text which follows, in the context of describing the conveying units 2, 102, 202 in more detail, reference is made in each case to conveying unit 2, although the description is similarly applicable to conveying units 102 and 202.

Figure 2:
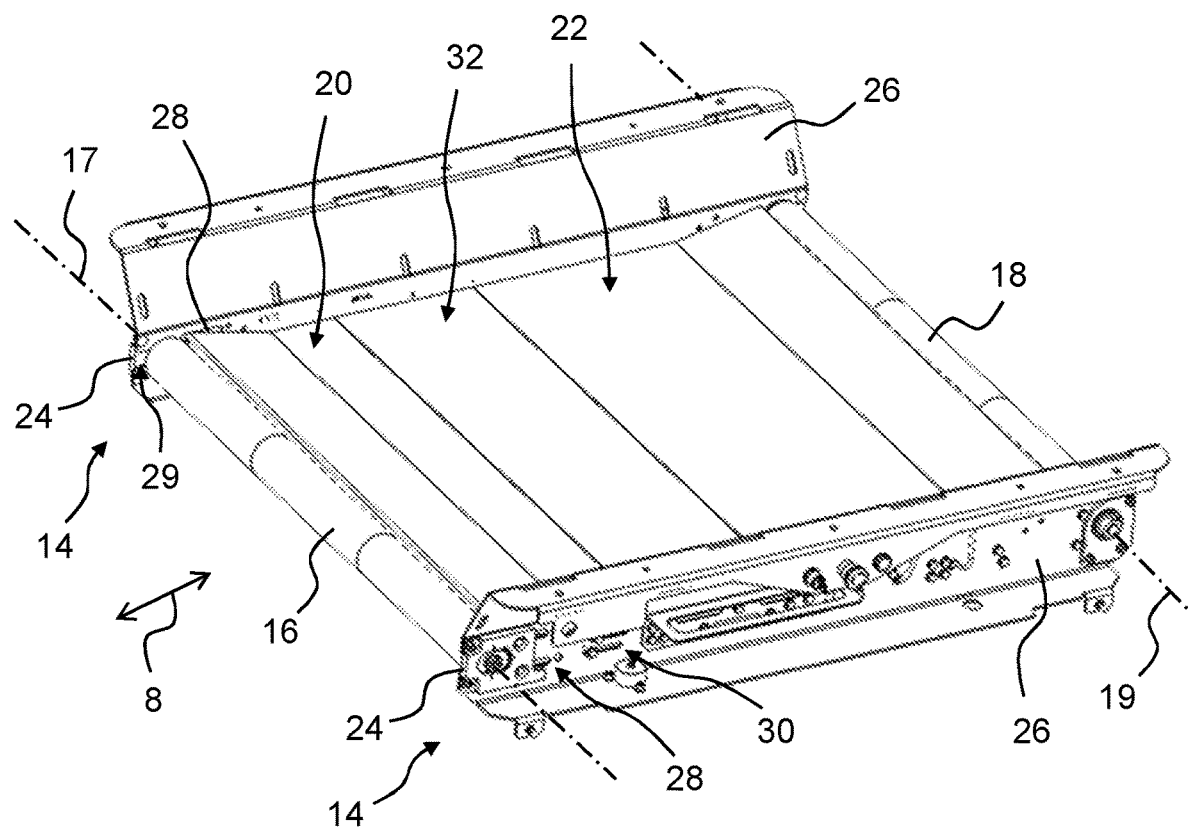
FIG. 2 shows a three-dimensional illustration of a part of a conveying unit that may form part of the conveying systems according to FIGS. 1*a*-1*c*.
Figure 3:
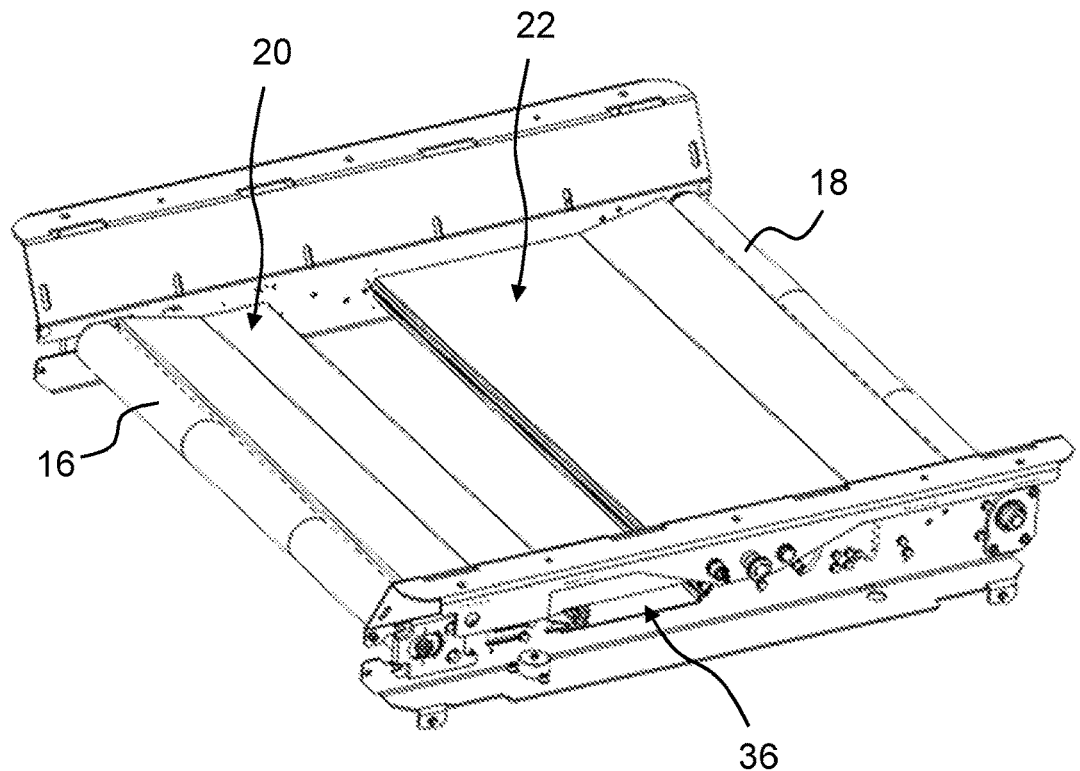
FIG. 3 shows the conveying unit according to FIG. 2 in a state different to that shown in FIG. 2.
Figure 4:
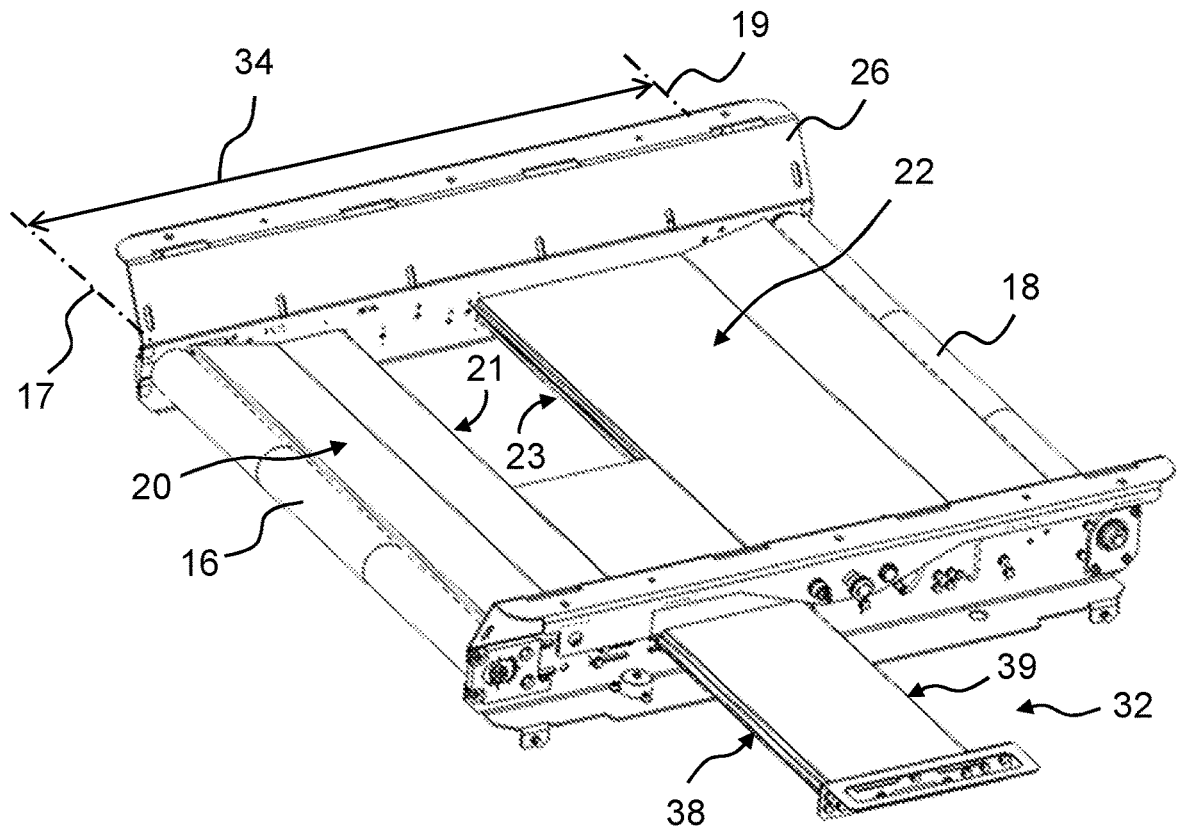
FIG. 4 shows the conveying unit according to FIG. 2 in another state different to those shown in FIGS. 2 and 3.

FIGS. 2, 3 and 4 show the conveying unit 2 without the displacement device 10 and without a conveyor belt 4 so that components of the conveying unit 2 within the circuit of the conveyor belt 4, that is to say between the two rotating elements 16, 18, are clearly visible. The conveying unit 2 has a chassis 14. In this case, the chassis 14 is connected to the displacement device 10. Furthermore, the conveying unit 2 has a first roll-shaped rotating element 16, in the form of a roll in the present exemplary embodiment, and a second roll-shaped rotating element 18, also in the form of a roll in the present exemplary embodiment, which are provided parallel to and spaced apart from one another on the chassis 14 so as to be rotatable about a respective first axis of rotation 17 and second axis of rotation 19. More specifically, the chassis 14 has two opposite elongate chassis parts 26 between which the first 16 and second 18 rotating element, the first 20 and second filler piece 22 extend and by means of which said components are connected. The conveyor belt 4 is passed around the two rotating elements 16, 18, one or both of the two rotating elements 16, 18 being able to be driven in order to thus be able to displace an upper part of the conveyor belt that can support a product in operation in a conveying direction 8. For this purpose, the conveying unit has a drive device which is not shown in any more detail.

The conveying unit 2 has a first filler piece 20 between the two rotating elements 16, 18, said first filler piece being formed, at least in the present exemplary embodiment, in an elongate manner by means of extrusion. The filler piece 20 extends along the first rotating element 16 and is panel-shaped, in order to thus support the conveyor belt 4, or at least an upper part of the conveyor belt that supports a product in operation, during operation. Between the first filler piece 20 and the second rotating element 18, the conveying unit 2 also has a second filler piece 22, which is also elongate and panel-shaped in the present exemplary embodiment, for supporting the conveyor belt 4. In the present exemplary embodiment, the second filler piece 22 extends along the second rotating element. The first filler piece 20 is connected to the first rotating element 16 in such a way that the first filler piece 20 and the first rotating element 16 are provided on the chassis so as to be jointly displaceable in relation to the second rotating element 18 in the transverse direction 8, transversely with respect to the first axis of rotation 17, in a direction towards and away from the second rotating element. This is achieved by connecting the rotating element 16 to the first filler piece 20 via coupling plates 24, wherein the assembly of rotating element 16, filler piece 20 and coupling plates 24 can be displaced back and forth in the conveying direction 8 in slots 28, 29, 30 in the two chassis parts 26. The second rotating element 18 is fastened to the chassis 14 in a rotatable manner, and secured against displacement in the conveying direction 8.

Each conveying unit 2 also has a spacer element 32 which is, or at least can be, provided in a fitting manner between the first filler piece 20 and second filler piece 22. The spacer element 32 is panel-shaped and removable. The first 20 and second 22 filler piece and the spacer element 32 together form a support surface for the conveyor belt 4. In use, a predetermined operating distance 34 between the axes of rotation of the first and second rotating element is determined, that is to say defined, as a result of the placing of the spacer element 32 between the first and second rotating element, that is to say within the circuit of the conveyor belt 4. In this case, the spacer element 32 thus also extends between the chassis parts 26, at least in a state when the spacer element has been placed as shown in FIG. 2, and extends transversely with respect to the extension direction of the chassis parts and parallel to the axes of rotation of the rotating elements. A cutout 36 is provided (see FIG. 3) in one of the two chassis parts 26, the front chassis part 26 in the view according to the figures, through which cutout the spacer element 32 may pass for placing the spacer element 32 between the filler pieces 20, 22. The latter is shown in FIG. 4 in which the spacer element 32 has been partially slid between the filler pieces 20, 22 and may still be slid further in order to placing the spacer element.

From a comparison of FIGS. 2 and 3 it is clear that the first rotating element 16 is closer to the second rotating element 18 in FIG. 3 than in FIG. 2. In other words, a mutual distance between the rotating elements is then smaller than the predetermined operating distance. This is possible because the spacer element 32 has not been placed, that is to say is separate from the conveying unit, in the state of the conveying unit 2 according to FIG. 3. This results in the possibility of sliding the combination of the first rotating element 16 and first filler piece 20 towards the second rotating element 18, guided by the slots 24, 28 and 30 as explained above. This makes it easier to place a new conveyor belt. In a first variant, this placing of the conveyor belt may be effected by removing one of the chassis parts 26 and attaching an endless conveyor belt around the rotating elements 16, 18 by sliding said conveyor belt around the rotating elements 16, 18 from the side where no chassis part 26 is present. The removed chassis part 26 can then be fitted again. In a second variant, this may be effected by passing a conveyor belt having two free ends around the rotating elements and fastening the ends to each other.

Subsequently, that is to say in both variants of placing a conveyor belt as mentioned above, the spacer element 32 may be slid between the two filler pieces 20, 22, thus in the space within the circuit of the conveyor belt, via the cutout 36. To this end, the combination of rotating element 16 and first filler piece 20 may firstly be forced, optionally using a tool which is suitable therefor, away from the second rotating element 18, so as to thus make space for placing the spacer element 32. This tensions the conveyor belt 4. This tension may be increased to some extent so as to make more space for easier placing of the spacer element. After the spacer element 32 has been placed, and optionally the tool has been removed, the spacer element determines an operating distance between the rotating elements. In this case, it is in principle not necessary for the first rotating element 16 to be secured to the chassis 14 prior to displacement in the conveying direction 8, since it is already blocked against displacement towards the second rotating element 18 by the presence of the spacer element 32 and displacement away from the second rotating element 18 is limited by the conveyor belt 4 which is passed around the rotating elements.

In order to make the placing of the spacer element 32 easier and in order to be able to effectively place the spacer element 32 between the two filler pieces, the first 20 and second filler piece 22 each comprise a longitudinal guide 21 and 23, respectively. In this case, the panel-shaped spacer element has, on opposite longitudinal sides, a respective guide element 38, 39 configured to cooperate with the longitudinal guides 21, 23. As shown, the respective longitudinal guides 21, 23 of the first and second elongate filler piece 20, 22 extend parallel to the first and second axes of rotation 17, 19. The spacer element 32 can thus be slid between the filler pieces, parallel to the axes of rotation. In an alternative embodiment, the spacer element may be in the shape of a wedge, the filler pieces being adapted to this shape. This makes it possible to slide the spacer element between the two filler pieces in a very simple manner, with the narrowest side of the wedge shape first.

A method for placing, according to the invention, a conveyor belt on a conveying unit of the conveying system according to the invention may therefore comprise the following steps:
- a) placing the conveyor belt 4 around the first and second rotating element 16, 18 while the spacer element 32 is separate from the conveying unit 2 and the first and second rotating element are at a mutual distance that is smaller than the predetermined operating distance 34,
- b) increasing the mutual distance between the first and second rotating element 16, 18 by displacing the first rotating element 16 together with the first filler piece 20 away from the second rotating element 18, so as to thus make space for the spacer element 32 between the first and second filler piece 20, 22,
- c) placing the spacer element 32 in a fitting manner between the first and second filler piece, as a result of which the operating distance 34 between the first and second rotating element 16, 18 is determined.

In this case, in one variant of the method, the conveyor belt, in particular in the case of an endless conveyor belt, may be placed when the conveying unit 2 is in a state where only one of the two chassis parts 26 is connected to the first and second rotating element, after which the second of the two chassis parts is connected to the first and second rotating element.

In this case, the increasing of the mutual distance according to step b) may also be implemented by jointly displacing, using a tool, the first rotating element 16 and the first filler piece 20 counter to a tension in the conveyor belt 4 away from the second rotating element 18, as a result of which the mutual distance becomes at least equal to the predetermined operating distance. In this situation, the tension in the conveyor belt 4 may be temporarily increased in relation to a tension in the conveyor belt during use of the conveying unit 2.

In one variant, the increasing of the mutual distance according to step b) may be implemented by the attachment of the spacer element according to step c), for example by embodying the spacer element in the shape of a wedge and adapting the filler pieces to this shape.

The invention claimed is:

1. A conveying system comprising a plurality of conveying units for conveying products from a supply location to a discharge location,
    each of the plurality of conveying units comprising:
    a chassis,
    a first roll-shaped rotating element and a second roll-shaped rotating element which are provided parallel to and spaced apart from one another on the chassis so as to be rotatable about a respective first and second axis of rotation,
    a conveyor belt which is passed around the first and second rotating elements and forms a supporting surface for a product,
    a first filler piece which is provided between the first and second rotating elements, and a second filler piece which is fastened to the chassis between the first filler piece and the second rotating element,
    wherein the first filler piece is connected to the first rotating element in such a way that the first filler piece and the first rotating element are provided on the chassis so as to be jointly displaceable towards the second rotating element and away from the second rotating element in a direction transverse to the first axis of rotation, and
    a removable spacer element which, in use, is provided in a fitting manner between the first and second filler piece, wherein a predetermined operating distance between the first and second rotating element is determined as a result of the spacer element being placed between the first filler piece and the second filler piece.

2. The conveying system according to claim 1, wherein the spacer element is panel-shaped, and/or wherein the first filler piece and second filler piece are panel-shaped.

3. The conveying system according to claim 1, wherein the first and second filler piece each comprise a longitudinal guide and wherein the spacer element comprises, on opposite longitudinal sides thereof, a respective guide element which is configured to cooperate with the longitudinal guides in order to place the spacer element between the first and second filler piece by sliding the spacer element between the first and second filler piece.

4. The conveying system according to claim 3, wherein the respective longitudinal guides of the first and second filler piece extend parallel to the first and second axes of rotation.

5. The conveying system according to claim 1, wherein the first and second filler piece and the spacer element together form a support surface for the conveyor belt.

6. The conveying system according to claim 1, wherein the chassis comprises two opposite elongate chassis parts between which the first and second rotating element, the first and second filler piece and the spacer element extend.

7. The conveying system according to claim 6, wherein a cutout is provided in at least one chassis part, through which cutout the spacer element may pass for placing the spacer element between the first and second filler piece.

8. A method for placing a conveyor belt on a conveying unit of the conveying system according to claim 1, comprising:
    a) placing the conveyor belt around the first and second rotating element while the spacer element is separate from the conveying unit and the first and second rotating element are at a mutual distance that is smaller than the predetermined operating distance,
    b) increasing the mutual distance between the first and second rotating element by displacing the first rotating element together with the first filler piece away from the second rotating element, so as to thus make space for the spacer element between the first and second filler piece,
    c) placing the spacer element in a fitting manner between the first and second filler piece, as a result of which the operating distance between the first and second rotating element is determined.

9. The method according to claim 8, wherein step a) comprises:
    placing the conveyor belt when the conveying unit is in a state where only one of the two chassis parts is connected to the first and second rotating element, after which the second of the two chassis parts is connected to the first and second rotating element.

10. The method according to claim 8, wherein the increasing of the mutual distance according to step b) is implemented by jointly displacing the first rotating element and the first filler piece counter to a tension in the conveyor belt away from the second rotating element, as a result of which the mutual distance becomes at least equal to the predetermined operating distance.

11. The method according to claim 8, wherein the increasing of the mutual distance according to step b) is implemented by the placing of the spacer element according to step c).

12. The method according to claim 10, wherein jointly displacing the first rotating element and the first filler piece is performed using a tool.

\* \* \* \* \*